(12) United States Patent
Farrell et al.

(10) Patent No.: US 7,437,048 B2
(45) Date of Patent: Oct. 14, 2008

(54) EQUIPMENT BAY CABLE MANAGEMENT SYSTEM

(75) Inventors: Daniel Farrell, Wheaton, IL (US); Jerome D. Pavlick, Downers Grove, IL (US); Philip T. Brinkerhoff, Union, NJ (US)

(73) Assignee: Tellabs Operations, Inc., Naperville, IL (US)

( * ) Notice: Subject to any disclaimer, the term of this patent is extended or adjusted under 35 U.S.C. 154(b) by 49 days.

(21) Appl. No.: 11/206,429

(22) Filed: Aug. 18, 2005

(65) Prior Publication Data

US 2007/0041693 A1    Feb. 22, 2007

(51) Int. Cl.
    *G02B 6/00* (2006.01)
(52) U.S. Cl. ............... 385/135; 385/134; 385/138; 385/139; 385/147; 385/27; 385/89; 398/81
(58) Field of Classification Search ............ 385/27, 385/134–135, 136, 147, 138–139, 89; 174/99 R, 174/99–101; 398/81
See application file for complete search history.

(56) References Cited

U.S. PATENT DOCUMENTS

| | | | | |
|---|---|---|---|---|
| 6,541,705 B1 * | 4/2003 | McGrath | .......... | 174/99 R |
| 6,571,047 B1 * | 5/2003 | Yarkosky et al. | .......... | 385/135 |
| 6,614,978 B1 * | 9/2003 | Caveney | .......... | 385/135 |
| 6,845,206 B2 | 1/2005 | Dwyer et al. | | |
| 7,207,835 B2 * | 4/2007 | Levesque et al. | .......... | 439/540.1 |
| 2004/0033015 A1 * | 2/2004 | Andersen et al. | .......... | 385/27 |
| 2006/0269207 A1 * | 11/2006 | Ivancevic | .......... | 385/135 |

OTHER PUBLICATIONS

Panduit Network Connectivity Group, Modular Patch Panels, pp. C8-C35.
Fiber Management Tray, NEBS Level 3 Certified, pp. 1-16.

* cited by examiner

*Primary Examiner*—Brian Healy
*Assistant Examiner*—Guy G Anderson
(74) *Attorney, Agent, or Firm*—Dean D. Small; The Small Patent Law Group LLP

(57) ABSTRACT

A cable management system is provided that is configured to be located between adjacent equipment racks, while being vertically oriented to extend upward along a narrow space between the adjacent equipment racks. The cable management system comprises a main panel extending along a vertical longitudinal axis, the main panel having a series of module cutouts provided therein and oriented to extend along the longitudinal axis. The system further includes inter-bay functional modules secured in at least two of the module cutouts. The inter-bay functional modules include at least two of a fiber spool module, a patch panel module and a dispersion compensation module. The main panel includes a front wall having the module cutouts formed therein. The front wall is integrally joined with side flanges extending rearward therefrom to form a channel cross-section.

20 Claims, 7 Drawing Sheets

EQUIPMENT BAY CABLE MANAGEMENT SYSTEM

BACKGROUND OF THE INVENTION

The present invention relates generally to equipment and accessories used with fiber and multiple-fiber cable (e.g., optical fiber, electrical cable and the like). Hereafter, the terms "fiber" and "cable" shall be used inter-changeably. More particularly, the certain embodiments relates to a configurable fiber management assembly that manages fiber connection equipment bays, wherein the manager is capable of storing slack or excess fiber, relieving longitudinal strain on the fiber bundles, and generally facilitating the organization and direction of the fiber to the various equipment of the equipment bay.

Fiber management systems exist today in a variety of configurations. In certain fiber management systems, vertical racks are mounted to the floor and/or ceiling and are configured to support various equipment. Heretofore, fiber management trays have been provided within the fiber management system, with different types of trays being provided for different applications. Examples of tray configurations include termination only trays, termination and splice trays, termination and storage trays and slack storage trays. In one conventional fiber management system, a rectangular tray is configured to fit between equipment bays that are horizontally stacked in a common equipment rack. Fibers that are connected to each equipment bay enter the system through top inlets and exit the system through various outlets arranged along the sides of the tray. The tray defines a storage chamber in which excess fiber is located and stored between horizontally stacked equipment bays. A mechanism is added to the system to take up slack within the fiber.

However, conventional fiber management systems experienced certain disadvantages. Today's telecommunications equipment is required to carry a significant amount of cabling in more and more condensed areas. The architecture of certain types of products present a need to manage cable routing, dispersion compensation and patch panel connectivity in a more efficient manner between equipment bays and racks. Further, conventional systems are limited in where the various parts of the system may be positioned, such as where to place slack management spools, patch panels, dispersion elements and the like. Also, conventional fiber management systems are unable to provide multifunctional, fully configurable small footprint arrangements, and offer a limited number of different rack level products that may be utilized with the system.

A need exists for a fiber management assembly that effectively manages equipment bay to bay fiber connections so as to store neatly the slack in fibers connected between associated equipment bay(s) while relieving longitudinal strain on the fibers. An assembly is also needed that eliminates the risk of excessive bending of the fiber connected to an equipment bay while facilitating organization and direction of the fiber to the equipment bays.

BRIEF DESCRIPTION OF THE INVENTION

In one embodiment, cable management system is provided that is configured to be located between adjacent equipment racks, while being vertically oriented to extend upward along a narrow space between the adjacent equipment racks. The cable management system comprises a main panel extending along a vertical longitudinal axis. The main panel has a series of module cutouts provided therein and oriented to extend vertically along the longitudinal axis. The system is configured to receive inter-bay functional modules secured in the module cutouts. The inter-bay functional modules may include one or more of a fiber spool module, a patch panel module and a dispersion compensation module. The main panel includes a front wall having the module cutouts formed therein. The front wall is integrally joined with side flanges extending rearward therefrom to form a channel shaped cross-section.

In accordance with an alternative embodiment, an equipment and cable management system is provided that includes an equipment rack, a main panel and inter-bay functional modules. The equipment rack has side brackets extending vertically upward and spaced apart to define an equipment bay receiving area there between. The side brackets are configured to retain securely equipment bays in a horizontal orientation. The main panel extends along a vertical longitudinal axis and is secured to one of the side brackets of the equipment rack. The main panel has a series of module cutouts provided therein and oriented to extend along the longitudinal axis. The modular cutouts are positioned to face in a common direction as a front face of the equipment rack. The inter-bay functional modules may include one or more of a fiber spool module, a patch panel module and a dispersion compensation module.

DETAILED DESCRIPTION OF THE INVENTION

Figure 1:
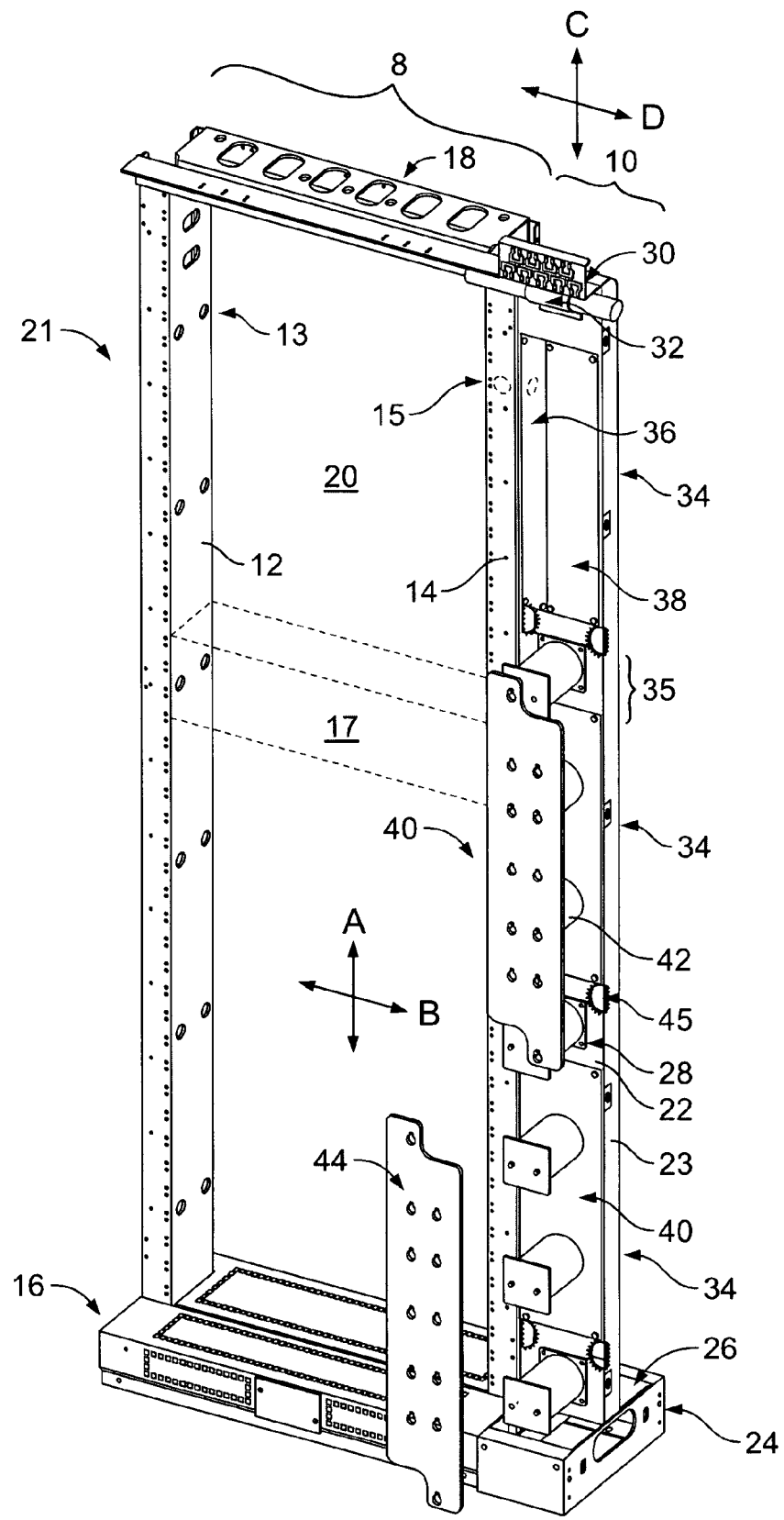
FIG. 1 illustrates an equipment and cable management system formed in accordance with an embodiment of the present invention.

FIG. 1 illustrates an equipment rack 8 joined to a cable management system 10 that is formed in accordance with an embodiment of the present invention. The equipment rack 8 may be located in a common area with multiple equipment racks of similar construction positioned adjacent one another and spaced apart by a short distance (e.g., a few inches or a few feet).

Each equipment rack 8 includes a pair of vertical brackets 12, 14 joined at lower ends to a base 16 and at upper ends to an upper crossbeam 18. The brackets 12,14, base 16 and crossbeam 18 are arranged in, and collectively define, an equipment bay receiving plane (generally denoted by crossing vertical and horizontal axes A & B, respectively). The equipment rack 8 includes a front face 21, and the brackets 12, 14 are separated by an equipment bay receiving area 20. The brackets 12,14 each include equipment securing apertures 13, 15, respectively, located immediately across the bay 20 from one another. The apertures 15 are illustrated in dashed lines as the apertures 15 are covered by the cable management system 10. The apertures 13,15 are spaced vertically to support a series of equipment bays (one of which is shown in dashed line at 17) in a stacked arrangement, with each equipment bay 17 facing the front face 21 of the equipment rack 8 and extending laterally (parallel to the horizontal axis B) across the equipment bay receiving area 20.

The cable management system 10 is secured along one side of the equipment rack 8 to bracket 14. Optionally, cable management system 10 may be joined to bracket 12, or a pair of cable management systems 10 may be located on opposite sides of the equipment rack 8 and joined to both brackets 12, 14. Each cable management system 10 includes a main panel 22 having a length that extends vertically parallel to axis A along the length of the bracket 14 between the base 16 and crossbeam 18. The main panel 22 has a width that extends laterally from the bracket 14 along the equipment bay receiving plane in a direction away from the equipment bay receiving area 20. The main panel 22 has a front wall that is formed integral with side flanges 23 that extend rearward in a C-shaped or U-shaped channel cross-section. The main panel 22 is formed with a series of module cutouts 34 provided there through. In the exemplary embodiment, the module cutouts 34 are rectangular in shape; although alternative module cutout shapes may be utilized. Alternatively, combinations of module cutout shapes may be provided in the main panel 22. The module cutouts 34 are oriented with a long axis C extending in the direction of vertical axis A and with a short axis D extending in the direction of horizontal axis B. The series of module cutouts 34 are aligned in common along the long axis C. By way of example only, and without limiting the size of the opening, the module cutouts 34 may be sized to hold a common industry standard 19 inch rack mount device or an off-the-shelf commodity device that can be mounted in a 19 inch equipment rack.

The module cutouts 34 are separated by bridge portions 35. Fiber spools 28 are mounted to the bridge portions 35 of the main panel 22. The fiber spools 28 extend forward from a front plane of the main panel 22 and are utilized to manage excess cable slack. A lacing bracket 30 is joined to an upper end of the main panel 22. A piping bracket 32 is secured to the lacing bracket 30.

In the example of FIG. 1, upper, mid and lower module cutouts 34 are provided. Alternatively, fewer or more module cutouts 34 may be provided. Further, the module cutouts 34 may differ in size from one another and be unevenly spaced along the vertical length of the main panel 22. The upper module cutout 34 is closed with a single blank cutout filler 36 and a double blank cutout filler 38, both securely mounted to the main panel 22. The mid and lower module cutouts 34 have spool modules 40 secured therein. Each spool module 40 includes a mounting plate 41 with a series of spools 42 projecting forward from the mounting plate 41 in a direction perpendicular to the equipment bay receiving plane and outward from the front face 21 of the equipment rack 8. A spool cover panel 44 is secured over outer ends of the spools 42 to close the spaces between the spools 42 and maintain cables in an organized wrapped manner vertically aligned thereon. The lower cutout 34 also has a spool module 40 secured thereto, illustrated with the spool cover panel 44 removed.

A lower end of the main panel 22 is joined to a base spacer 24 that defines a minimum spacing between adjacent equipment racks 8. The base spacer 24 has a hollow interior and is at least partially covered with a base cover 26. The main panel 22 further includes cable pass-through holes 45 cut there through. The cable pass-through holes 45 enable single or bundles of cables (e.g., fiber optic cables and the like) to pass there through in order to interface with other equipment.

Figure 2:
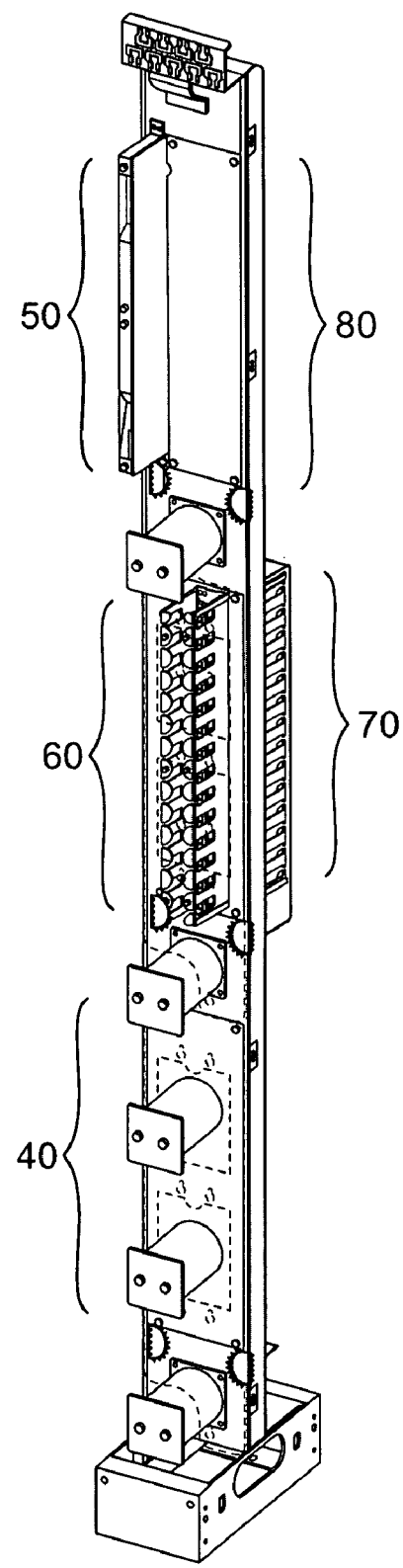
FIG. 2 illustrates the cable management system of FIG. 1, with alternative inter-bay functional modules secured therein.

FIG. 2 illustrates one exemplary configuration of various types of inter-bay functional modules that may be retained securely in the module cutouts 34. Examples of inter-bay functional modules include fiber spool modules 40, dispersion compensation modules 50, patch panel modules 60, cable management brackets 70, filler plates 80 and the like. An example of patch panel modules 60 is a RCMM fiber patch panel that may have 8 MTP parts, each MTP part having 6 duplex wavelengths utilizing 12 fiber connections. Optionally, more than one module of the same type may be provided in the module cutouts 34. Optionally, the order of the modules within the cable management system 10 may be varied. For example dispersion compensation modules 50 may be located in lower module cutouts 34, while patch panel modules 60 may be located in upper module cutouts 34. Optionally, spool modules 40 may be removed entirely. The inter-bay functional modules may be secured to the cable management system 10 through various means, such as screws, adhesive, bolts, latches, Velcro, snaps and the like.

Figure 3:
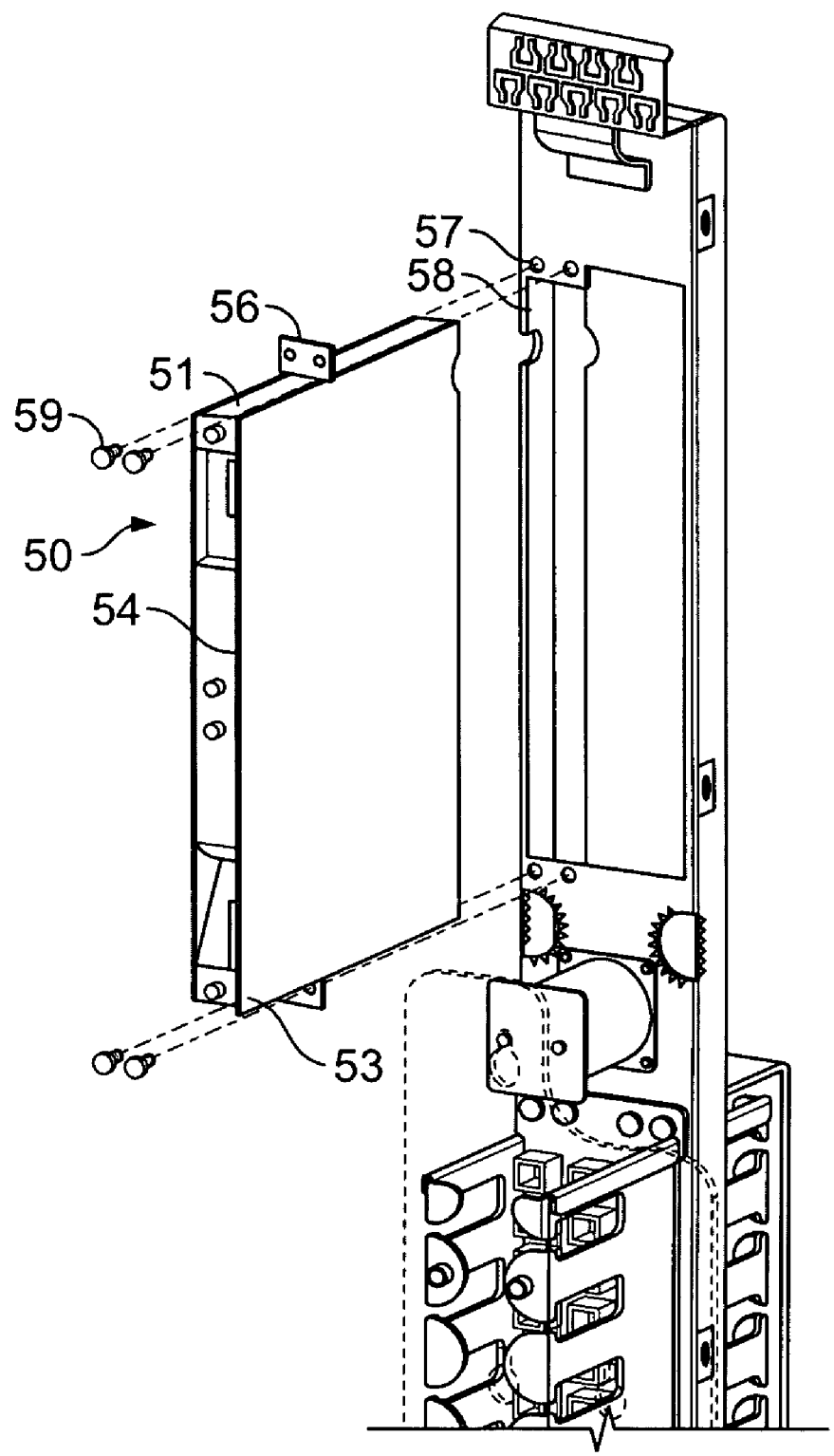
FIG. 3 illustrates an exploded view of a portion of the cable management system and a dispersion compensation module formed in accordance with an embodiment of the present invention.

FIG. 3 illustrates a dispersion compensation module 50 (e.g., a 1RU module) separated from, but aligned to be received in, a first portion 52 of the module cutout 34. The dispersion compensation module 50 includes a housing 54 that contains dispersion compensation electronics. The housing 54 is shaped as an elongated cartridge with narrow (in the lateral direction) top and bottom walls 51 and 53 having mounting shelves 56 secured thereto. The mounting shelves 56 extend upward and downward from the top and bottom walls 51 and 53. The mounting shelves 56 have holes there through that are dimensioned and spaced to align with holes 57 in the main panel 22. The dispersion compensation module 50 includes receptacles configured to receive plugs that electrically join the electronics within the dispersion compensation module 50 to the electronics within equipment bays.

Figure 4:
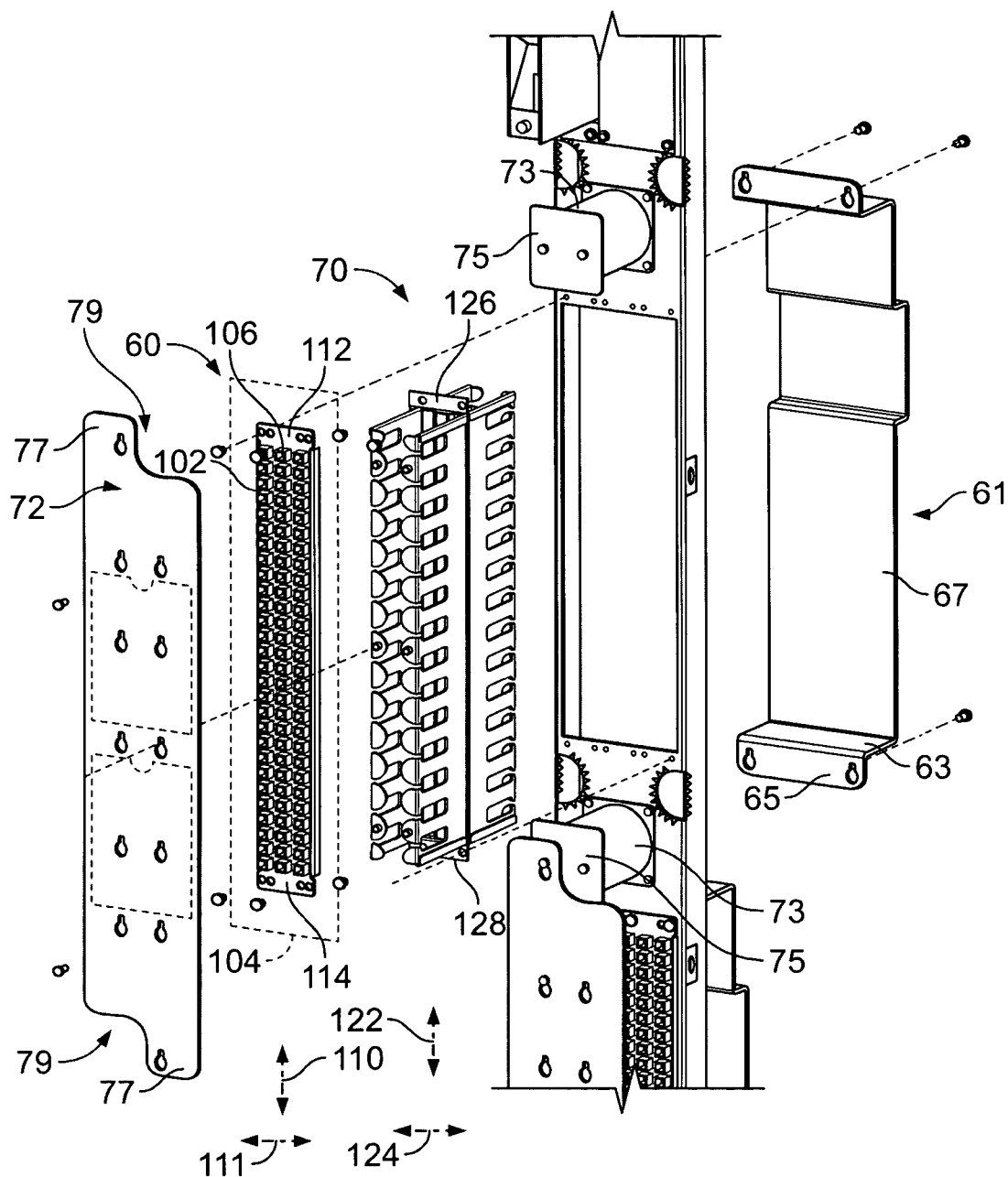
FIG. 4 illustrates an exploded view of a portion of the cable management system and a patch panel module and fiber management channel bracket formed in accordance with an embodiment of the present invention.

FIG. 4 illustrates an exploded view of a patch panel module 60 aligned with a first portion of a module cutout 34, and a cable management bracket 70 aligned with a second portion of the module cutout 34. The patch panel module 60 includes a patch panel housing 102 having a generally rectangular shape to define a patch panel housing plane 104. The patch panel housing 102 may be injection molded and may include an array of ports 106 extending in rows and columns (e.g., to provide a 84 SC/SC or 168 LC/LC position patch panel configuration). Each port 106 includes contacts (not shown) configured to join with a mating plug. The patch panel housing 102 has a length that extends along a long axis 110, and has a width that extends along a short axis 111. The housing 104 has upper and lower flanges 112, 114 located at opposite ends of the long axis 110 of patch panel housing 104. The flanges 112,114 include openings configured to align with similar opening through the main panel 22 to secure the patch panel housing 104 to main panel 22.

FIG. 4 further illustrates the cable management bracket 70 in more detail. The cable management bracket 70 is configured to be secured in a second portion of the same module cutout 43 as the patch panel module 60, where the first and second portions are arranged in a side-by-side manner. The cable management bracket 70 is generally configured with an elongated shape having a length extending along the long axis 122 and a width extending along the short axis 124. Opposite end flanges 126, 128 of the cable management bracket 70 include holes that align with similar holes in the same panel to receive means to secure the cable management bracket 70 to the main panel 22.

Figure 5:
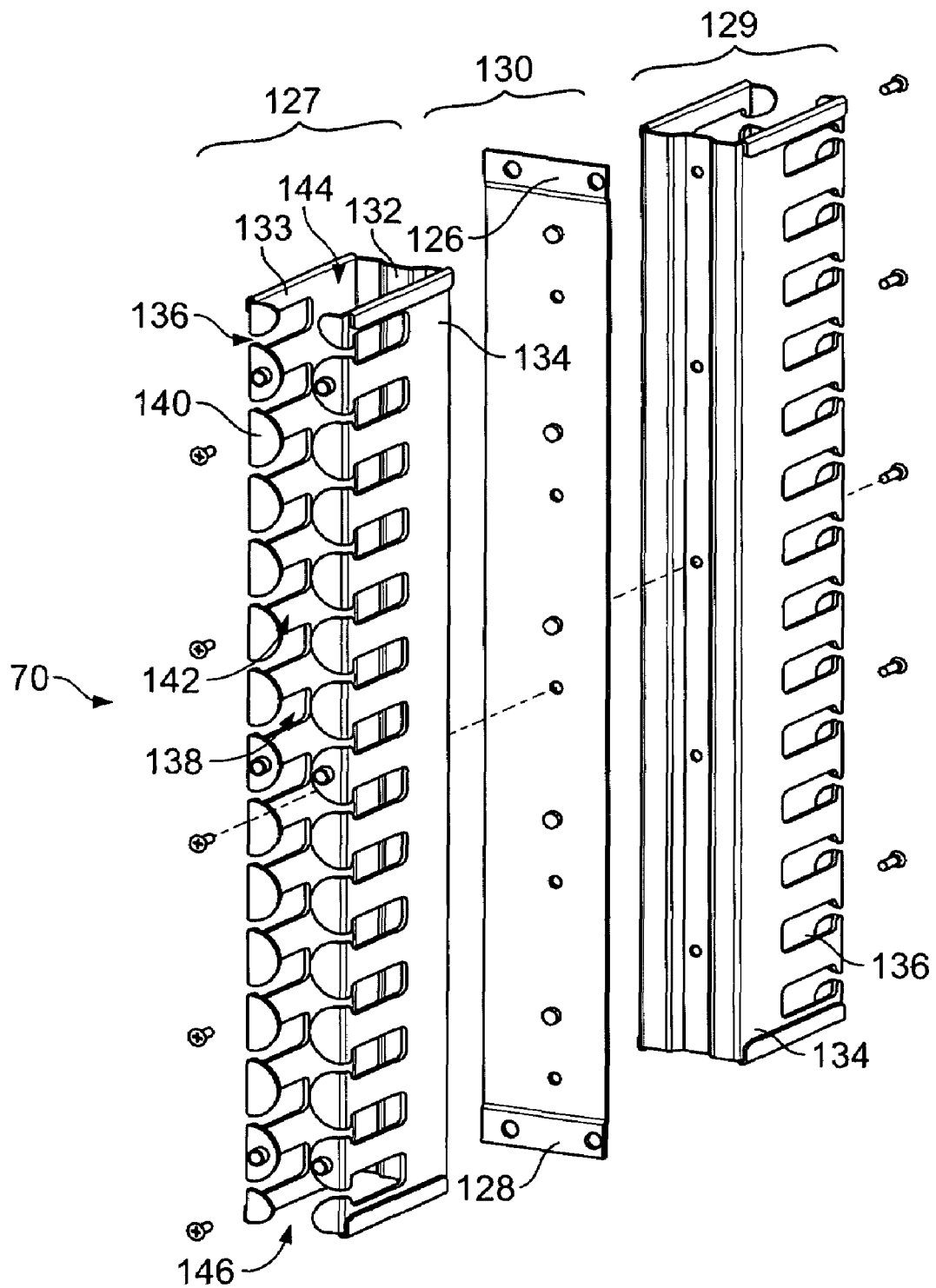
FIG. 5 illustrates an exploded view of a fiber management channel bracket formed in accordance with an embodiment of the present invention.

FIG. 5 illustrates an exploded view of the cable management bracket 70. The cable management bracket 70 includes an intermediate frame 130 that is formed integral with the upper and lower flanges 126, 128. The cable management bracket 70 further includes front and rear channel assemblies 127, 129 that are secured to front and rear surfaces of the frame 130. Each of the front and rear channel assemblies 127, 129 have a base 132 formed integral with walls 133, 134 that extend outward from the base 132 and perpendicular to the plane defined by the frame 130. The walls 133, 134 are separated to define a cable retention chamber 138 there between that has an open front face 142, and open upper and lower ends 144 and 146. The walls 133, 134 have notches 136 cut therein to permit cables to enter and exit chamber 138. Outer ends of the walls 133, 134 are bent inward to face toward one another, such that the bent portions define retention tips 140 that partially close the open front face 142, otherwise provided between walls 133, 134. The cable management bracket 70 receives and retains cables attached to the plugs secured in the patch panel housing 104 to maintain such cables in an organized arrangement.

Returning to FIG. 4, a cover 72 is secured to platforms 75 provided on spools 73 to cover the patch panel module 60 and cable management bracket 70. The ends of the cover 72 include lip portions 77 and adjacent notched-out portions 79. Opposite ends of the cover 72 are arranged in a mirrored arrangement in order that facing ends of adjacent covers 72 may be joined to a common one of the platform 75. A rear bracket 61 is provided with a body 67 having legs 63 formed integrally at opposite ends thereof. The legs 63 have flanges 65 flared to extend upward and downward from opposite ends of the body 67. The legs 63 space the body 67 outward away from the main panel 22 to provide an area to hold the rear channel assembly 129.

When the cover 72 is secured to the corresponding spools 73, the cover 72 extends across and shields the front of the patch panel housing 104 and cable management bracket 70. The cover 72 further assists in maintaining the cables in an organized manner while transitioning from the patch panel housing 104 to a destination area.

Figure 6:
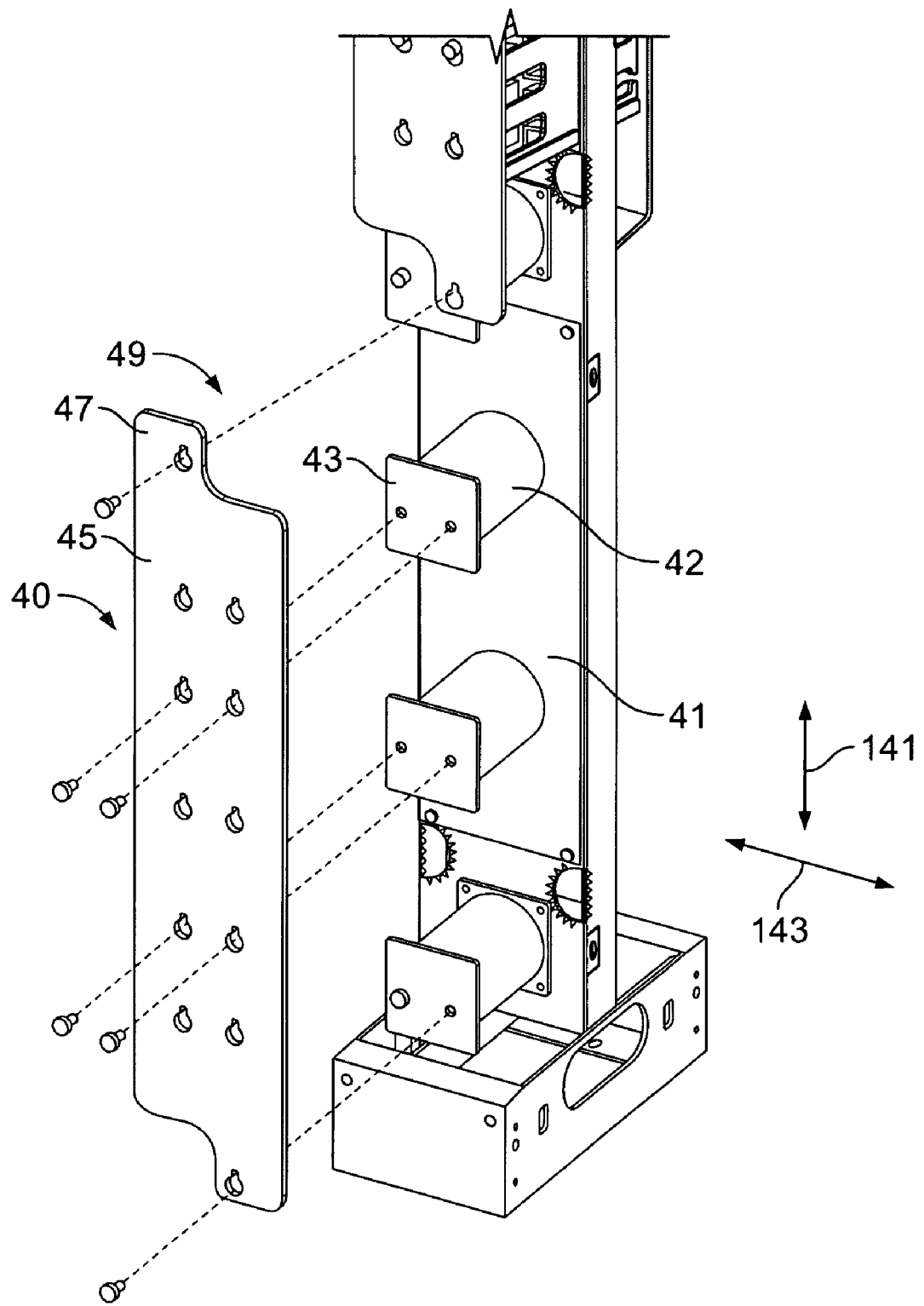
FIG. 6 illustrates a partially exploded view of a spool module formed in accordance with an embodiment of the present invention.

FIG. 6 illustrates an exploded view of a spool module 40 as joined to the main panel 22. The spool module 40 includes a spool base 41 having a length extending along a long axis 141 and a width extending along a short axis 143. The spool base 41 includes tubular shaped spools 42 joined thereon and projecting outward perpendicular to the plane of the spool base 41. Outer ends of the spools 42 include platforms 43 having an outer contour that is larger than the circumference of the spool 42. The platforms 43 assist in retaining cables on the spools 42 when wrapped about the spools 42. A spool cover 45 is illustrated with a series of openings therein that are configured to align with similar openings in the platform 43 on each spool 42 to facilitate securing of the cover 45 to the spool module 40 by securing means. The cover 45 has a length extending along the long axis 141 and a width extending along the short axis 143, with opposite ends along the long axis 141 having a lip portion 47 and an adjacent cutout portion 49. The lip and cutout portions 47 and 49 on opposite ends of the cover 45 are provided in a mirrored arrangement of one another in order that adjacent covers 45 may be secured to a common spool 42. The lip and notched out portions 47 and 49 of adjacent covers 45 align with one another in an interleaved manner such that lip portions 47 of two separate but adjacent covers 45 are secured to a common platform 43 on a single spool 42.

Figure 7:
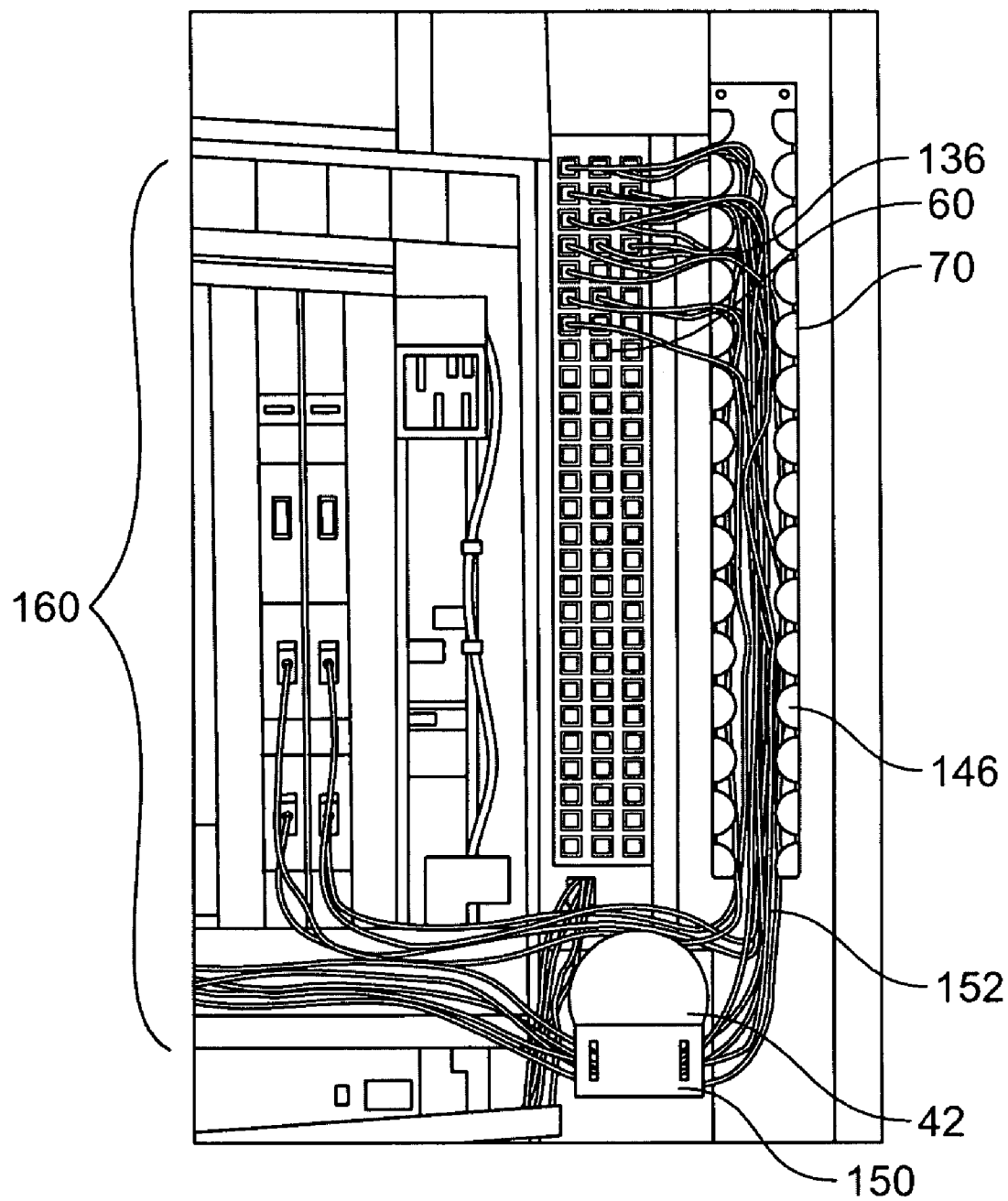
FIG. 7 illustrates a front view of a patch panel module formed in accordance with an embodiment of the present invention.

FIG. 7 illustrates an exemplary application of the cable management system 10 in connection with cables routed to/from an equipment bay 160. In the example of FIG. 7, a group of cables 150 are wrapped about a spool 42, while another group 152 of cables are routed through an open bottom end 146 of a cable management bracket 70. Individual cables exit/enter the chamber 138 of the cable management bracket 70 through the notches 136 and are terminated at plugs secured in ports of the patch panel module 60.

The above described system 10 may be used in various applications, such as a back plane for equipment which has a 6 inch by 19 inch opening on the back thereof, such as a Tellabs Model 3600, 5500, or 7100, in order to pass through and manage a plurality fiber optic cable bundles. The system 10 may be used with other equipment wherein cable management is desired.

While the invention has been described in terms of various specific embodiments, those skilled in the art will recognize that the invention can be practiced with modification within the spirit and scope of the claims.

What is claimed is:

1. A cable management system configured to be located between adjacent equipment racks and extending vertically upward along a space between the adjacent equipment racks, the equipment racks each having a front face, the system comprising:

a main panel extending vertically upward along a side of an equipment rack, the main panel having a series of module cutouts provided therein and oriented to open in a direction common with a front face of the equipment rack and to extend along the side of the equipment rack, the module cutouts being configured to receive inter-bay functional modules, the inter-bay functional modules including a least two of a fiber spool module, a patch panel module and a dispersion compensation a module.

2. The system of claim 1, further comprising fiber spools mounted to the main panel and positioned between adjacent cutouts, the fiber spools being configured to manage excess cable slack to relieve longitudinal strain on said cable.

3. The system of claim 1, wherein the main panel further comprises a front wall aligned with the front face of the equipment rack, the front wall being integrally joined with side flanges extending rearward to form a channel, the front wall having the module cutouts formed therein and located adjacent the front face.

4. The system of claim 1, wherein further comprising at least one of a dispersion compensation module, a patch panel module, and a dual fiber spool module secured in the at least one of the module cutouts.

5. The system of claim 1, wherein the main panel further includes fiber pass-through openings cut there through, the fiber pass-through openings being positioned between adjacent module cutouts.

6. The system of claim 1, wherein at least one of the module cutouts contains a 1RU dispersion compensation module secured in one of the cutouts in a vertical orientation and extending along a vertical plane unlined parallel to a longitudinal axis of the main panel.

7. The system of claim 1, further comprising a patch panel module secured in one of the module cutouts, the patch panel module having housing extending along a long axis oriented parallel to a longitudinal axis of the main panel.

8. The system of claim 1, further comprising a patch panel module and a fiber management channel bracket both secured in a single one of the module cutouts, the patch panel module and the fiber management channel bracket being positioned side-by-side and having housings extending along long axes oriented side-by-side and parallel to a longitudinal axis of the main panel.

9. The system of claim 1, further comprising a fiber spool module having a mounting plate and a front cover, the mounting plate being secured to the main panel over one of the module cutouts, the fiber spool module having fiber spools for managing excess cable slack, the fiber spools extending outward from the mounting plate and between the mounting plate and front cover.

10. The system of claim 1, further comprising a spacer base joined to a lower end of the main panel.

11. The system of claim 1, further comprising a fiber lacing bracket secured to an upper end of the main panel.

12. An equipment and cable management system, comprising:
 an equipment rack having a front face and having side brackets extending vertically upward and spaced apart by an equipment bay receiving area, the side brackets being configured to securely retain equipment bays;
 a main panel extending along a vertical longitudinal axis and secured to one of the side brackets of the equipment rack, the main panel having a front wall located adjacent to the front face of the equipment rack, the front wall having a series of module cutouts provided therein and oriented to extend along the longitudinal axis; and
 inter-bay functional modules secured in at least two of the module cutouts, the inter-bay functional modules including at least two of a fiber spool module, a patch panel module and a dispersion compensation module.

13. The system of claim 12, further comprising fiber spools mounted to the main panel and positioned between adjacent cutouts, the fiber spools being configured to manage excess cable slack to relieve longitudinal strain on said cable.

14. The system of claim 12, wherein the main panel further comprises side flanges extending rearward to form a channel, the front wall orienting the module cutouts to align the inter-bay functional modules with the front face of the equipment rack.

15. The system of claim 12, wherein the inter-bay functional modules include a 1RU dispersion compensation module, an 84 position SC/SC patch panel module, a 168 position LC/LC module and a dual fiber spool module secured in three separate ones of the module cutouts.

16. The system of claim 12, wherein the main panel further includes a front plate having fiber pass-through openings cut there through.

17. The system of claim 12, wherein the main panel further includes fiber pass-through openings cut there through, the fiber pass-through openings being positioned between adjacent module cutouts.

18. The system of claim 12, wherein at least one of the cutouts contains a 1RU dispersion compensation module secured in one of the cutouts in a vertical orientation and extending along a vertical plane unlined parallel to the longitudinal axis of the main panel.

19. The system of claim 12, further comprising a patch panel module secured in one of the cutouts, the patch panel module having housing extending along a long axis oriented parallel to the longitudinal axis of the main panel.

20. The system of claim 12, further comprising a fiber spool module having a mounting plate and a front cover, the mounting plate being secured to the main panel over one of the cutouts, the fiber spool module having fiber spools for managing excess cable slack, the fiber spools extending outward from the mounting plate and between the mounting plate and front cover.

* * * * *